United States Patent
Kagalwala et al.

(10) Patent No.: US 7,020,655 B2
(45) Date of Patent: *Mar. 28, 2006

(54) REPRESENTING DATABASE PERMISSIONS AS ASSOCIATIONS IN COMPUTER SCHEMA

(75) Inventors: Raxit A. Kagalwala, Issaquah, WA (US); John Patrick Thompson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/966,196

(22) Filed: Oct. 15, 2004

(65) Prior Publication Data

US 2005/0076044 A1 Apr. 7, 2005

Related U.S. Application Data

(63) Continuation of application No. 09/789,329, filed on Feb. 20, 2001, now Pat. No. 6,810,400.

(60) Provisional application No. 60/249,495, filed on Nov. 17, 2000.

(51) Int. Cl.
*G06F 17/30* (2006.01)

(52) U.S. Cl. .................. 707/100; 707/102; 707/103 R

(58) Field of Classification Search ............ 707/103 R, 707/103 X, 104.1; 709/220
See application file for complete search history.

(56) References Cited

U.S. PATENT DOCUMENTS

| | | |
|---|---|---|
| 5,569,207 A | 10/1996 | Gisselberg et al. |
| 5,596,745 A | 1/1997 | Lai et al. |
| 5,692,129 A | 11/1997 | Sonderegger et al. |
| 5,794,030 A | 8/1998 | Morsi |
| 5,937,409 A | 8/1999 | Wetherbee |
| 5,956,725 A | 9/1999 | Burroughs et al. |
| 5,956,730 A | 9/1999 | Burroughs et al. |
| 6,081,808 A | 6/2000 | Blackman et al. |
| 6,085,198 A | 7/2000 | Skinner et al. |
| 6,125,363 A | 9/2000 | Buzzeo et al. |
| 6,134,559 A | 10/2000 | Brumme et al. |
| 6,157,928 A | 12/2000 | Sprenger et al. |
| 6,163,776 A | 12/2000 | Periwal |
| 6,170,005 B1 | 1/2001 | Meandzija |
| 6,243,709 B1 | 6/2001 | Tung |
| 6,289,339 B1 | 9/2001 | Weber |
| 6,317,748 B1 | 11/2001 | Menzies et al. |
| 6,330,555 B1 | 12/2001 | Weber |
| 6,374,252 B1 | 4/2002 | Althoff et al. |
| 6,374,253 B1 | 4/2002 | Weider et al. |
| 6,374,256 B1 | 4/2002 | Ng et al. |
| 6,405,202 B1 | 6/2002 | Britton et al. |
| 6,493,719 B1 | 12/2002 | Booth et al. |
| 6,496,833 B1 | 12/2002 | Goldberg et al. |
| 6,569,207 B1 | 5/2003 | Sundaresan et al. |
| 6,571,232 B1 | 5/2003 | Goldberg et al. |
| 2002/0059293 A1 | 5/2002 | Hirsch |
| 2002/0107872 A1 | 8/2002 | Hudis |
| 2002/0116385 A1 | 8/2002 | Kagalwala et al. |
| 2002/0156790 A1 | 10/2002 | Kagalwala et al. |
| 2003/0088576 A1* | 5/2003 | Hattori et al. .......... 707/103 R |

* cited by examiner

*Primary Examiner*—Jeffrey Gaffin
*Assistant Examiner*—Neveen Abel-Jalil
(74) *Attorney, Agent, or Firm*—Lee & Hayes, PLLC

(57) ABSTRACT

A database schema includes database classes that represent various database objects (e.g., tables, views, etc.) and user classes that represent users and roles of the database. The database schema also has permission classes that represent permissions of the users/roles with respect to the database objects. The permission classes are modeled in the database schema as associations between database classes and user classes.

6 Claims, 4 Drawing Sheets

REPRESENTING DATABASE PERMISSIONS AS ASSOCIATIONS IN COMPUTER SCHEMA

RELATED APPLICATIONS

This application is a continuation of U.S. patent application Ser. No. 09/789,329, filed Feb. 20, 2001, now U.S. Pat. No. 6,810,400, which claims priority to U.S. Provisional Application No. 60/249,495, filed Nov. 17, 2000.

TECHNICAL FIELD

This invention relates to databases, database management systems, and database management schemas.

BACKGROUND

Database management systems (DBMS) are core components of virtually every enterprise (e-business) application. The ability to effectively configure, monitor, and manage a DBMS is critical to the success of enterprise applications.

Most DBMSs are designed for compatibility with relational databases. A relational database comprises a plurality of tables. Each table has a plurality of data records (rows) and each table includes a definition of the fields (columns) that the records will contain. A relational database includes the specification of relationships between fields of different tables. A DBMS performs common management tasks such as creating databases, adding tables, replication management, data backup, etc.

The Desktop Management Task Force (DMTF) Common Information Model (CIM) is an approach to the management of systems, software, users, and networks that applies the basic structuring and conceptualization techniques of the object-oriented paradigm. More specifically, the purpose of CIM is to model various computer-related systems—both hardware and software. It is important to recognize that object-oriented modeling is different from object-oriented programming.

This type of modeling uses schemas to represent systems. A schema is an abstraction of something that exists in the real world. Generally, a schema comprises a collection of classes and associations.

A class models a set of objects that have similar properties and fulfill similar purposes. In a database management schema, for example, individual classes might define such things as files, users, tables, etc.

Classes follow a hierarchical structure. Classes can have subclasses, also referred to as specialization classes. The parent class of a subclass is referred to as a superclass or a generalization class. A class that does not have a superclass is referred to as a base class.

A typical schema might comprise a collection of different schemas, which in this case can also be referred to as subschemas. Such subschemas are often located in various different namespaces. A namespace is simply a way to logically group related data. Within a given namespace, all names are unique. Within the following disclosure, the terms "schema" and subschema are used interchangeably.

A subclass inherits properties of its superclass. All properties and methods of a superclass apply to the subclass.

It is conventional to represent a class by a rectangle containing the name of the class. FIG. 1 shows an example. A class with properties is represented by a rectangle divided into two regions as in FIG. 2, one containing the name of the class and the other a list of properties. Inheritance, or a subclass/superclass relationship, is represented by a line drawn between the subclass and the superclass, with an arrow adjacent to the superclass indicating the superclass. Lines representing inheritance are shown in FIG. 3, indicated by reference numeral 10.

Classes contain instances that are collections of values that conform to the type established by the class. Instances are identified by keys that are unique within the class. In other words, no two instances in the same class in the same namespace may have the same values for all of their key values. The term "object" may be used to refer to either an instance or a class.

An association represents a relationship between two or more objects. More specifically, an association is a mechanism for providing an explicit mapping between classes. Associations can be within a namespace or across namespaces. Associations are conventionally shown as a line between two classes, as indicated by reference number 12 in FIG. 3.

CIM schemas describe the gamut of managed elements: servers and desktops (operating systems, components, peripherals, and applications, all layers of the network (from Ethernet switches to IP and HTTP connections), and even end-users. Schema properties model the attributes that apply to objects, such as the type of printer or storage medium, RAM and CPU capacity, storage capacity, etc.

The discussion above gives a general overview of object-oriented modeling and CIM. Please refer to Winston Vumpus, John W. Sweitzer, Patrick Thompson, Andrea R. Westerinin, and Raymond C. Williams; *Common Information Model*, John Wiley & Sons, Inc., New York (2000) for further information regarding CIM. Also refer to Common Information Model (CIM) Specification, V2.0, Mar. 3, 1998, available from the Distributed Management Taskforce. DMTF has a number of other resources on its Internet web site.

SUMMARY OF THE INVENTION

A database schema described herein is an extension of the CIM core model. It has database classes that represent various database objects (e.g., tables, views, etc.) and user classes that represent users and roles of the database.

Unique to the database schema is a set of one or more permission classes that represent permissions of the users/roles with respect to the database objects. The permission classes are modeled in the database schema as associations between database object classes and user/role classes. By modeling the permissions as associations, the database schema effectively models methods of granting, denying, and revoking privileges. Additionally, the database schema provides a convenient way to query for users and roles that have permissions to utilize various database objects.

DETAILED DESCRIPTION

This disclosure addresses a database schema that is an extension schema of the Common Information Model (CIM) schema. In following discussion, the described database schema represents a relational database.

The database schema has a set of classes for various database objects (e.g., tables, views, databases, etc.), as well as classes for users and roles of the database. The database schema includes an abstract permission class that forms associations between the user or role classes and the database object classes. In this way, permissions for users and roles to use and access the database are established as associations between classes in the database schema.

Prior to describing the database schema, however, an exemplary computing environment is described to provide a context for implementing the schema.

Exemplary Computing Environment

Figure 1:
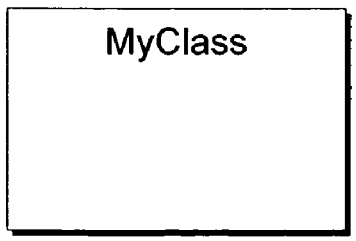
FIGS. 1–3 illustrate CIM drawing conventions.
Figure 2:
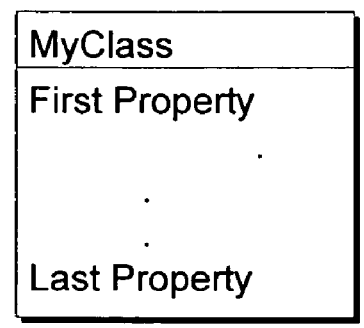
Figure 3:
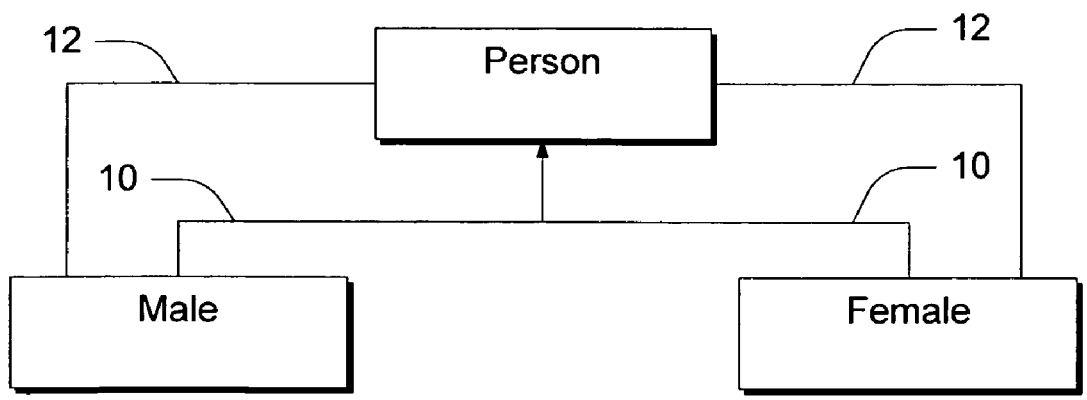
Figure 4:
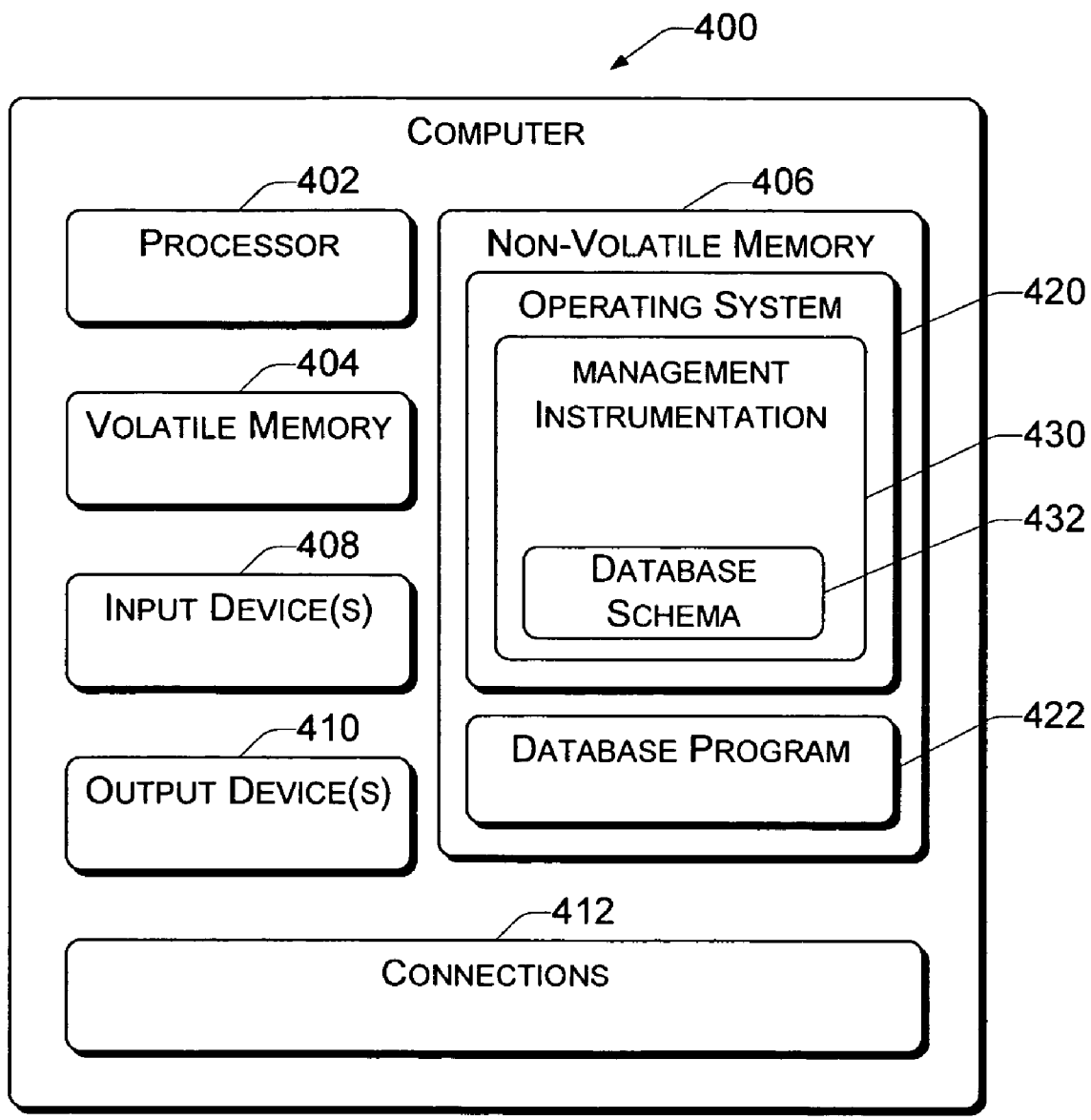
FIG. 4 is a block diagram showing components of a typical computer.

FIG. 4 shows an exemplary computer system 400 that implements the database schema. The computer 400 is representative of many different configurations, including personal computers, server computers, hand-held or laptop devices, multiprocessor systems, micro-processor systems, game consoles, set top boxes, programmable consumer electronics, network PCs, minicomputers, mainframe computers, distributed computing environments that include any of the above systems or devices, and the like. Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media.

Communication media typically embodies computer-readable instructions, data structures, program modules or other data in a modulated data signal such as a carrier wave or other transport mechanism and includes any information delivery media. By way of example, communication media includes wired media such as a wired network or direct-wired connection and wireless media such as acoustic, RF, infrared and other wireless media. Combinations of any of the above should also be included within the scope of computer readable media.

In the FIG. 4 illustration, the computer 400 has a processor unit 402 with one or more processors, volatile memory 404 (e.g., RAM), and non-volatile memory 406 (e.g., ROM, Flash, hard disk, optical, RAID memory, etc.). The computer 400 also includes one or more input devices 408 (e.g., keyboard, mouse, stylus, touch screen, microphone, etc.) and one or more output devices 410 (e.g., display, speakers, printer, cte.). A set of connections 412 may also be provided to facilitate wireless or wire-based communication wit other computers, peripherals, and the like.

The computer 400 runs an operating system 420. The "Windows" brand of operating systems, available from Microsoft Corporation of Redmond, Wash., is one example of a suitable operating system. The computer 400 is also illustrated as running a database program 422, although this may be executed on a separate computer. The "Microsoft SQL Server" brand of database programs, also available from Microsoft Corporation, is an example of a suitable database program.

For illustration purposes, operating system 420 and database program 422 are shown as discrete blocks stored in the non-volatile memory 406, although it is recognized that such programs and components reside at various times in different storage components of the computer 400 and are executed by the processor 402. Generally, these software components are stored in non-volatile memory 406 and from there, are loaded at least partially into the volatile main memory 404 for execution on the processor 402.

The "Windows 2000" operating system includes a service known as "Windows Management Instrumentation" (WMI) 430. WMI is a management infrastructure for managing the operating system, applications, and computer hardware. It includes Microsoft's implementation of the Web-Based Enterprise Management (WBEM) initiative, an industry standard administered by the Distributed Management Task Force (DMTF). WMI provides an object-oriented way of monitoring, configuring and controlling systems, services, and applications on the Windows platform. WMI objects consist of classes and instances of classes. The WMI classes may be derived from standard classes defined in the Common Information Model (CIM). WMI provides services such as SQL query language support and programmable event notification.

To support CIM, WMI maintains a system management schema definition. In many cases, the schema definition is stored in the WMI repository. The schema contains a definition of the classes, along with the properties and methods of these classes. The classes in a schema may be declared in one or more namespaces.

In particular, the computer 400 supports a database schema 432 for use in WMI to represent manageable components of the SQL server database. Such managed objects include tables, files, configuration data, and other logical components. The database schema is located in its own namespace (e.g., root\MicrosoftSQLServer).

Exemplary Database Schema

Figure 5:
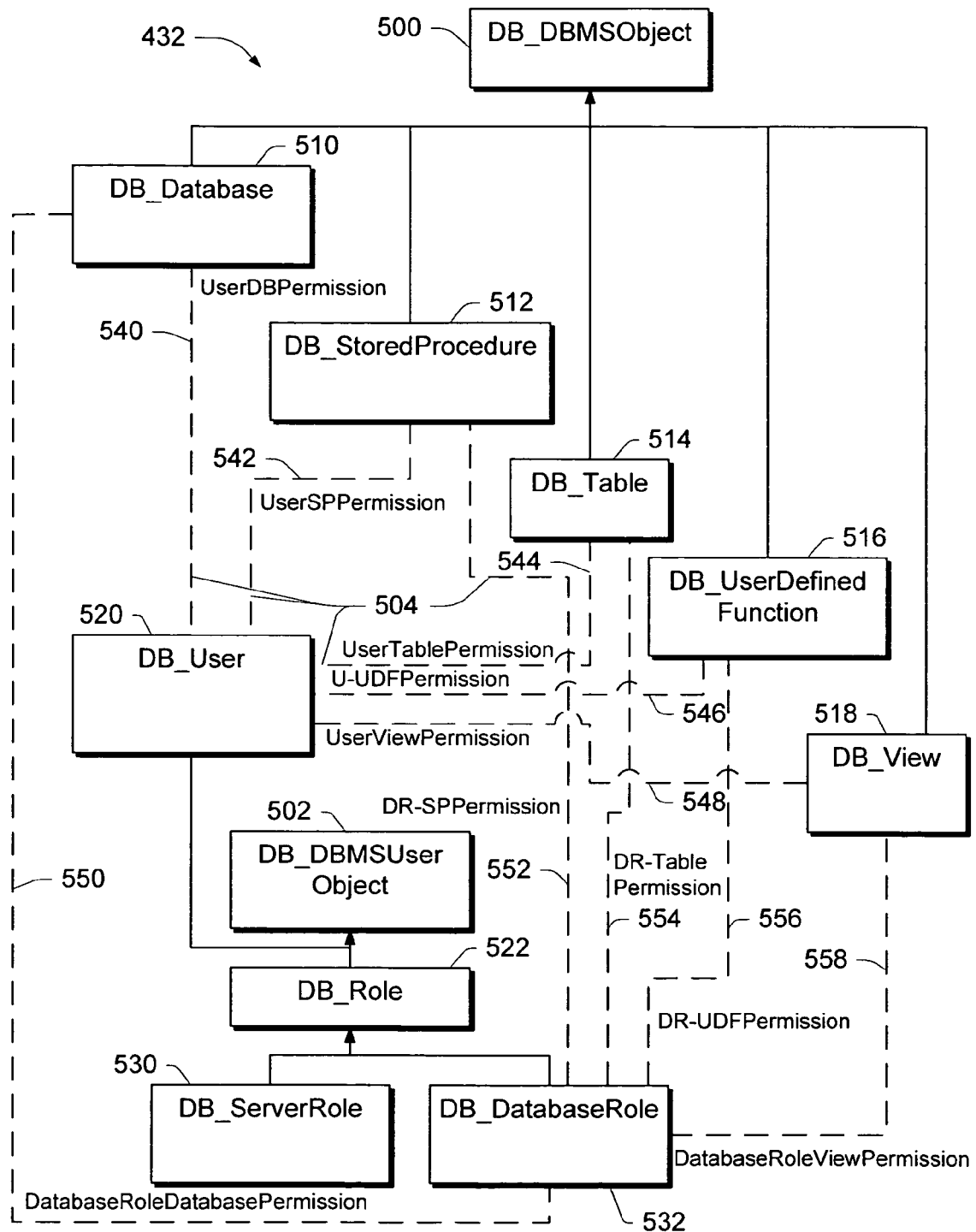
FIG. 5 illustrates a part of a database schema that deals with the security aspects of a database.

FIG. 5 shows portions of the database schema 432 in more detail. The depicted classes relate to users, roles, and database objects. Database schema 432 includes two superclasses: a database object superclass 500 and a user object superclass 502. Associations are defined between the database object class 500 and the user object class 502. The associations are defined by an association-type class, in this case referred to as a permission/association class 504. In the described embodiment, the permission/association class includes properties that indicate permissions granted to specific users with regard to specific databases and/or portions of databases.

It is noted that only pertinent classes and associations are illustrated. Other classes and associations (not shown) may also be included, but are not shown for ease of discussion. Furthermore, for discussion purposes, exemplary queries used in conjunction with the database schema are described in the context of Microsoft's SQL Server database software.

Database Object Superclass 500

The database object class 500 is an abstract class in that represents all database objects such as tables, columns, databases, and so forth. An "abstract" class is a base class for other classes to derive from, but is not populated with instances directly. As such, the database object class 500 is a superclass, and all other database classes are derived from this class. In FIG. 5, the subclasses beneath the database object superclass 500 are a database subclass 510, a stored procedure subclass 512, a table subclass 514, and a user defined function subclass 516, and a view subclass 518.

The database class 510 represents a database. In one exemplary implementation, the database class 510 represents an installation of Microsoft's SQL Server database software. The following queries can be used to enumerate all instances of a database in the Microsoft SQL Server installation named "MyServer\Instance2":

```
Associators of {MSSQL_SQLServer.Name="MyServer\\Instance2"}
where
    ResultClass = MSSQL_Database
    Select * from MSSQL_Permission where
    SQLServerName="MyServer\\Instance2"
```

Each database has various settings that are represented by a database setting class (not shown). Within the context of the exemplary SQL server database from Microsoft, the following queries can be used to obtain the settings of a fictitious "Northwind" database:

```
Select * from MSSQL_DatabaseSetting where
    SQLServerName="MyServer\\Instance2" And
    SettingID="Northwind"
```

Each database has one or more tables or views, as represented by the table class 514 and the view class 518, respectively. The database properties include space available, status, version, and so forth.

The stored procedure class 512 represents stored procedures in the databases. Its properties include transact-SQL text, the type of stored procedure, etc.

Some database software, such as Microsoft's "SQL Server 2000", supports user-defined functions and class 516 represents such functions. The user defined functions class 516 includes properties such as the text that defines the function, the name and status of the function and whether the function is defined by the system, etc.

User Object Superclass 502.

The user object class 502 models information pertaining to database users and roles. The user object class 502 is a superclass to two subclasses: a user subclass 520 and a role subclass 522. The user class 520 represents database users. Its properties include login name, . . . . The following query returns the login record used to authenticate a user:

```
Associators of
    {MSSQL_SQLServer.Name="Foo",
    DatabaseName="Northwind", SQLServerName="MyServer"}
    where AssocClass=MSSQL_UserLogin
```

The role class 522 represents the roles defined for a database installation. It is an abstract superclass from which two subclasses are derived: a server role subclass 530 and a database role subclass 532. The server role class 530 represents roles that are not constrained to a single database. Each server role is associated with one or more login objects (not shown) so that a user authenticated by login can assume the server role associated with the login. The following query yields the members of a server role class 530:

```
Associators of
    {MSSQL_SQLServer.Name="dbo", SQLServerName
    ="MyServer", DatabaseName="Northwind"}
    where AssocClass=MSSQL_MemberUser
```

The database role class 532 represents all roles defined for a database installation. The members of the database role can be a database user or another database role.

Permission Class 504 as Associations

The permission class 504 is an association-type class that associates a user or a role with a database object, such as a table, view, and database. The properties of the association class 504 capture the privileges that have been granted or denied to the user or role. Its properties represent the privilege type granted by the existence of the association and a Boolean indicating whether the privilege is currently active or not.

Various permission associations are derived from the permission class. In FIG. 5, the permission associations are defined between the database object classes 510–518 and the user class 520 and between the database object classes 510–518 and the database role class 532. The properties of each association class vary depending upon the user or role and database object being associated.

The permission associations between the database object classes 510–518 and the user class 520 include a user-database permission association 540, a user-stored procedure permission association 542, a user-table permission association 544, a user-user defined function permission association 546, and a user-view permission association 548. These permission associations represent permissions that users have for various database objects. For instance, the user-database permission association 540 represents the permissions that users have for the database and the user-table permission association 544 represents the permissions that users have for various tables.

The permission associations between the database object classes 510–518 and the role class 532 include a database role-database permission association 550, a database role-stored procedure permission association 552, a database role-table permission association 554, a database role-user defined function permission association 556, and a database role-view permission association 558. These permission associations represent permissions that database roles have for the database objects.

Figure 6:
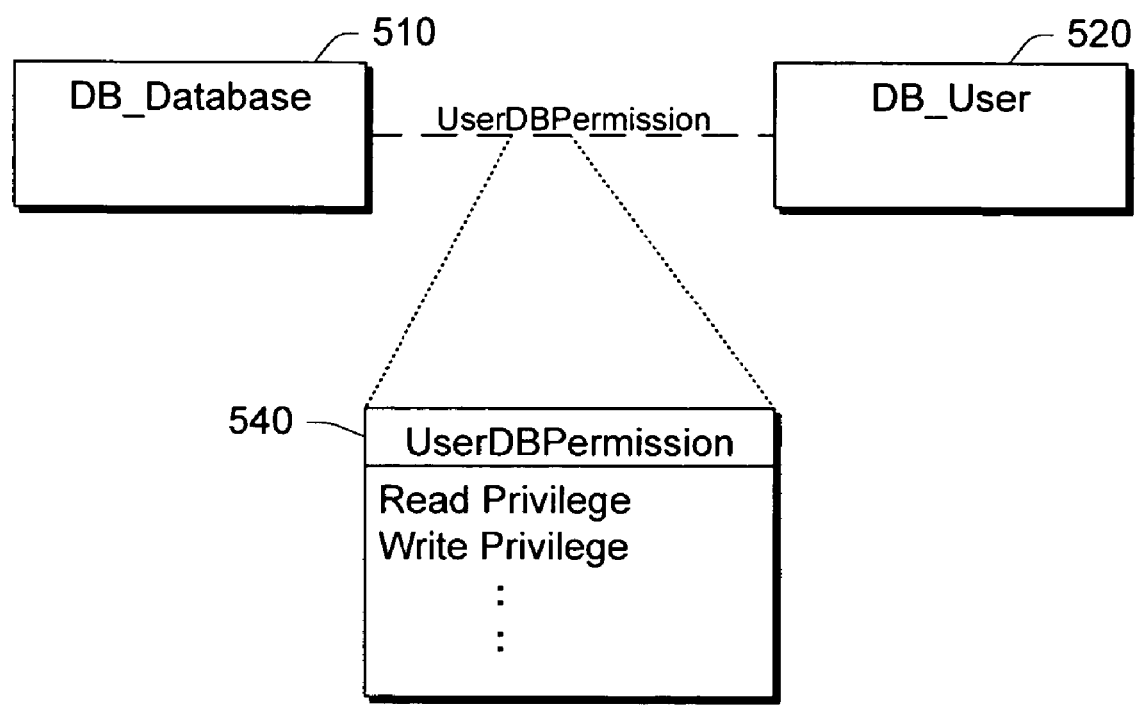
FIG. 6 illustrates an association-type class that represents permissions between two classes in the database schema of FIG. 5.

Each permission association is a class that has its own properties. FIG. 6 shows the user-View permission association 548 from FIG. 5 in more detail. The user-view permission association 548, named "UserViewPermission", associates the View class 518 and the user class 520 and represents permissions granted to a user for a View. Its properties include granted, privilege, and columnName, that define the rights and privileges individual users have with respect to the view instance.

Accordingly, by modeling the privileges as associations, the database schema 432 effectively models methods of granting, denying, and revoking privileges. For example, the database role-table permission association 554 represents the permissions that a database role has for a table. In the context of the Microsoft "SQL" database, creating an instance of the database role-table permission association 554 with the privilege type property set to a certain value and the granted property set to "true" effectively grants privileges to the database role for accessing the table.

Additionally, the database schema 432 formulates a convenient way to query for users and roles that have been granted privileges to utilize various database objects. Performing the following query, for example, returns the list of database roles with database privileges:

```
Select * from DB_Permission where
    Grantee="DB_DatabaseRole.Name=\"Role1\",
    ServerName=\"MyServer\"", DatabaseName=\"Northwind\""
```

The results of the following query yields a list of permissions for the table object:

```
Select * from DB_Permission where
    Element="DB_Table.Name=\"[dbo].[categories]\",
    DatabaseName = \"Northwind\", ServerName=\"MyServer\""
```

The name "[dbo].[categories]" is the name of a stored procedure.

The following query determines whether a particular user "User1" has permission to a database table object:

```
Select * from DB_Permission where
    Element="DB_Table.Name=\"[dbo].[categories]\",
    DatabaseName = \"Northwind\", ServerName=\"MyServer\""
    And
    Grantee="DB_User.Name=\"User1\",
    DatabaseName=\"Northwind\" ServerName=\"MyServer\"
```

Accordingly, the permission class efficiently models the permissions for various database objects as well as facilitates convenient queries as to which privileges have been granted to whom and for which resource.

CONCLUSION

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims.

The invention claimed is:

1. One or more computer-readable media having computer-executable instructions for performing steps comprising:

creating a data structure in accordance with a schema, the schema defining at least one database class that represents a database object, at least one user class that represents a database user, and at least one permission class that represents permissions of the database user with respect to the database object, the permission class being modeled as an association between the database class and the user class; and populating the data structure.

2. One or more computer-readable media as recited in claim 1, wherein the database class comprises one or more classes selected from a group of classes comprising a table class, a view class, a user defined class, a database class, and a stored procedure class.

3. One or more computer-readable media as recited in claim 1, wherein the user class comprises one or more classes selected from a group of classes comprising a user class and a role class.

4. A computer comprising:

means for creating a data structure in accordance with a schema, the schema defining at least one database class that represents a database object, at least one user class that represents a database user 1 and at least one permission class that represents permissions of the database user with respect to The database object, the permission class being modeled as an association between the database class and the user class; and means for populating the data structure.

5. A computer as recited in claim 4, wherein the database class comprises one or more classes selected from a group of classes comprising a table class, a view class, a user defined class, a database class 1 and a stored procedure class.

6. A computer as recited in claim 4, wherein the user class comprises one or more classes selected from a group of classes comprising a user class and a role class.

* * * * *

UNITED STATES PATENT AND TRADEMARK OFFICE
CERTIFICATE OF CORRECTION

PATENT NO. : 7,020,655 B2
APPLICATION NO. : 10/966196
DATED : March 28, 2006
INVENTOR(S) : Kagalwala et al.

It is certified that error appears in the above-identified patent and that said Letters Patent is hereby corrected as shown below:

In column 2, line 21, delete "(operating" and insert -- operating --, therefor.

In column 3, line 52, delete "cte." and insert -- etc. --, therefor.

In column 3, line 53, delete "wit" and insert -- with --, therefor.

In column 5, line 36, after "502" delete ".".

In column 6, line 45, delete "user-View" and insert -- user-view --, therefor.

In column 8, line 29, in Claim 4, delete "user 1" and insert -- user, --, therefor.

In column 8, line 31, in Claim 4, delete "The" and insert -- the --, therefor.

In column 8, line 39, in Claim 5, delete "class 1" and insert -- class, --, therefor.

Signed and Sealed this

Sixth Day of April, 2010

David J. Kappos
*Director of the United States Patent and Trademark Office*